US012658031B2

(12) United States Patent
Cui et al.

(10) Patent No.: US 12,658,031 B2
(45) Date of Patent: Jun. 16, 2026

(54) ACCURATE LOCATION SENSING FOR COMMUNICATING DATA TO TRANSPORTATION INFRASTRUCTURE SERVER

(71) Applicant: AT&T Intellectual Property I, L.P., Atlanta, GA (US)

(72) Inventors: Zhi Cui, Sugar Hill, GA (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 301 days.

(21) Appl. No.: 17/655,297

(22) Filed: Mar. 17, 2022

(65) Prior Publication Data

US 2023/0298460 A1      Sep. 21, 2023

(51) Int. Cl.
*G08G 1/01* (2006.01)
*H04W 4/029* (2018.01)
*H04W 4/90* (2018.01)

(52) U.S. Cl.
CPC ......... *G08G 1/0133* (2013.01); *G08G 1/0112* (2013.01); *G08G 1/0141* (2013.01); *G08G 1/0145* (2013.01); *H04W 4/029* (2018.02); *H04W 4/90* (2018.02)

(58) Field of Classification Search
CPC .. G08G 1/0133; G08G 1/0112; G08G 1/0141; G08G 1/0145; H04W 4/029; H04W 4/90
USPC ........................................................ 701/118
See application file for complete search history.

(56) References Cited

U.S. PATENT DOCUMENTS

| | | | | |
|---|---|---|---|---|
| 9,416,499 | B2 * | 8/2016 | Cronin | E01C 23/06 |
| 10,360,742 | B1 * | 7/2019 | Bellas | G07C 5/008 |
| 2016/0275790 | A1 * | 9/2016 | Kang | G06Q 10/10 |
| 2017/0092131 | A1 * | 3/2017 | Fairfield | G08G 1/0112 |
| 2018/0233042 | A1 * | 8/2018 | Zhang | G08G 1/096791 |
| 2018/0247541 | A1 * | 8/2018 | Cheremushkina | G08G 1/205 |
| 2019/0047578 | A1 * | 2/2019 | Swan | G06V 20/597 |

(Continued)

OTHER PUBLICATIONS

Gante, et al., "Dethroning GPS: Low-Power Accurate 5G Positioning Systems Using Machine Learning", Jun. 2020, IEEE (Year: 2020).*

*Primary Examiner* — Hunter B Lonsberry
*Assistant Examiner* — Helen Li

(57)                ABSTRACT

Described is accurate reporting of transportation-related incidents based on the wireless network positioning enhancements that can locate a device on the order of one meter or less. Upon encountering an incident, such as sensed road damage, an accident or another vehicle that is possibly in distress, a report is automatically generated and wirelessly sent to a smart transportation infrastructure server. The report includes or is augmented by the wireless network with accurate incident location data, along with incident type (e.g., pothole, or accident). Depending on the type of incident, the smart transportation infrastructure server can take appropriate actions, including summoning help, notifying the department of transportation of the need for road repairs and so forth. Other actions can include predicting traffic jams resulting from an incident, which can be used to notify other parties such as a wireless network to allocate additional resources/balance load accordingly.

19 Claims, 11 Drawing Sheets

(56) References Cited

U.S. PATENT DOCUMENTS

| | | | |
|---|---|---|---|
| 2019/0147736 A1* | 5/2019 | Camp .................. | G08G 1/0133 |
| | | | 340/905 |
| 2020/0023797 A1* | 1/2020 | Volos .................... | B60R 21/013 |
| 2020/0027333 A1* | 1/2020 | Xu ......................... | G08G 1/164 |
| 2020/0057772 A1* | 2/2020 | Holder .................... | G01W 1/02 |
| 2020/0175853 A1* | 6/2020 | Xu ............................ | G06F 7/08 |
| 2020/0279478 A1* | 9/2020 | Zhang ................. | G08G 1/0129 |
| 2021/0291819 A1* | 9/2021 | Smith .............. | B60W 30/0956 |
| 2021/0304592 A1* | 9/2021 | Lepp ....................... | H04W 4/40 |
| 2021/0396528 A1* | 12/2021 | St. Romain .......... | G06N 3/0455 |
| 2022/0070619 A1* | 3/2022 | White .............. | H04M 1/72454 |
| 2022/0363267 A1* | 11/2022 | Kristinsson .......... | B60W 40/09 |

* cited by examiner

300

312 — Take Action (e.g., Start Situation Analysis)

306 — Wireless Network Controller

308 Smart Transportation Infrastructure server

310 — Data Store

304

*Warning Possible Road Incident Near Location Z*

*Possible Road Incident Detected Near Location Z, Send Image*

302

*Camera View Captures, Image Processing Determines Possible Incident*

312

314

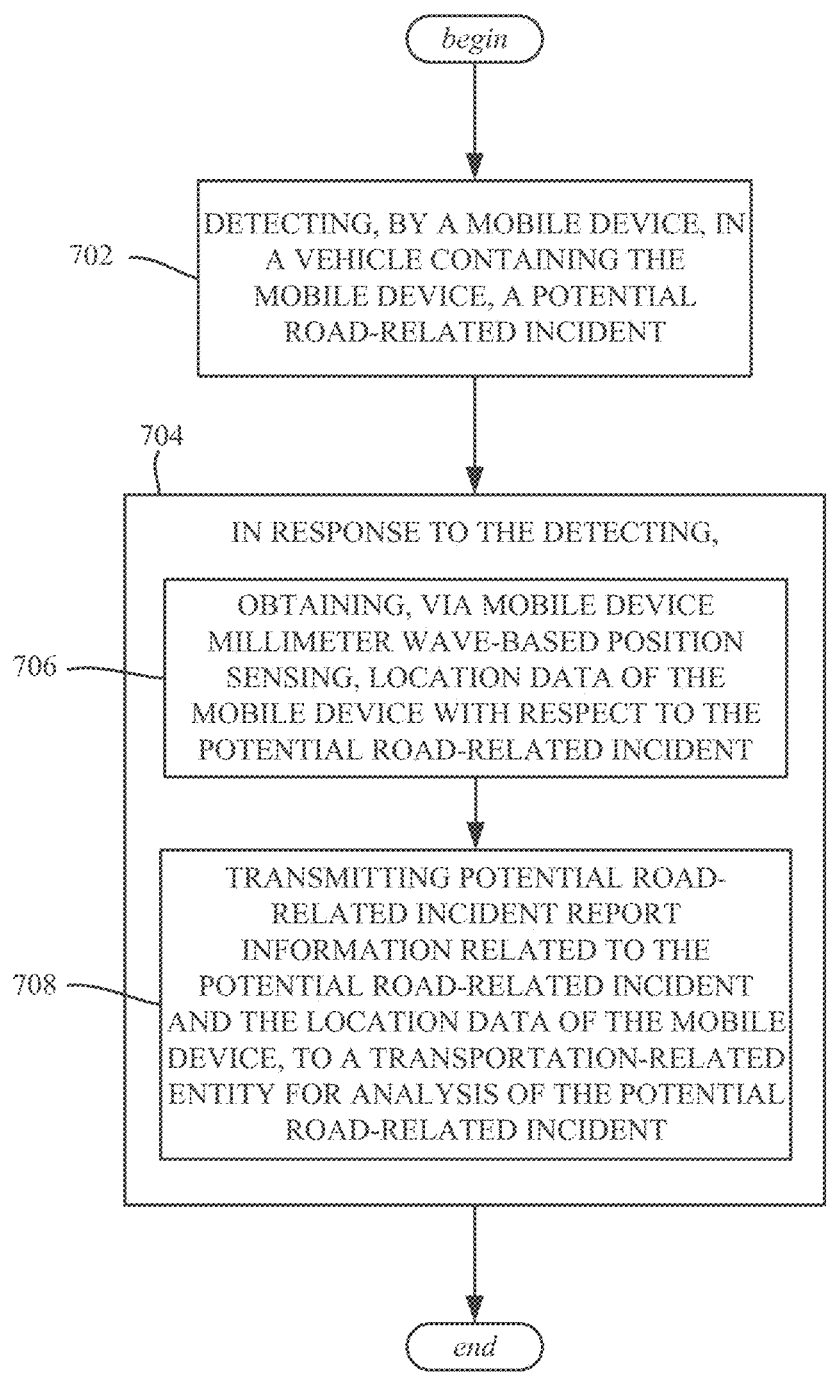

702 — DETECTING, BY A MOBILE DEVICE, IN A VEHICLE CONTAINING THE MOBILE DEVICE, A POTENTIAL ROAD-RELATED INCIDENT

704

IN RESPONSE TO THE DETECTING,

706 — OBTAINING, VIA MOBILE DEVICE MILLIMETER WAVE-BASED POSITION SENSING, LOCATION DATA OF THE MOBILE DEVICE WITH RESPECT TO THE POTENTIAL ROAD-RELATED INCIDENT

708 — TRANSMITTING POTENTIAL ROAD-RELATED INCIDENT REPORT INFORMATION RELATED TO THE POTENTIAL ROAD-RELATED INCIDENT AND THE LOCATION DATA OF THE MOBILE DEVICE, TO A TRANSPORTATION-RELATED ENTITY FOR ANALYSIS OF THE POTENTIAL ROAD-RELATED INCIDENT

FIG. 7

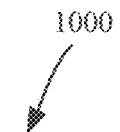

1000

```
MOBILE HANDSET

APPLICATIONS          ┌─ 1006
                   ┌──────────────────────┐
                   │ CLIENT (STORE,   ┌─ 1046
                   │ DISCOVERY,
    ┌─ 1008        │ PLAY)
  FIRMWARE ◄───    │
                   │ TRIGGER    ┌─ 1038
    ┌─ 1030        │ COMPONENT
   VIDEO  ◄───     │                         ┌─ 1018  ┌─ 1020
   COMP            │ HYSTERESIS ┌─ 1036      SUBSCRIBER
                   │ COMPONENT                IDENTITY
    ┌─ 1012        │                          SYSTEM
  DISPLAY ◄───     │ SIP CLIENT ┌─ 1040
                   └──────────────┘         ┌─ 1010
    ┌─ 1022                                 COMMUNICATION
  CAMERA ◄───                               COMPONENT
                        ┌─ 1002         ┌─ 1011   ┌─ 1013
    ┌─ 1014         PROCESSOR ◄───       CELL      WIFI
  SERIAL I/O ◄───                        TCVR      TCVR
  INTERFACE
                        MEMORY                    ┌─ 1032
    ┌─ 1035        1004 ─┘   ┌─ 1016      LOCATION
  USER INPUT ◄───   AUDIO I/O  COMPONENT
                              ┌─ 1024    ┌─ 1026
                             POWER       POWER
                             SOURCE ◄──► I/O
```

FIG. 10

ACCURATE LOCATION SENSING FOR COMMUNICATING DATA TO TRANSPORTATION INFRASTRUCTURE SERVER

TECHNICAL FIELD

The subject application relates to wireless communications systems in general, and more particularly to more accurate location sensing based on New Radio (NR) including fifth generation (5G) cellular wireless communications systems and/or other next generation networks.

BACKGROUND

In fifth generation (5G) wireless networks, new features are regularly being developed. According to standards of the third generation partnership project (3GPP) release 17, one such wireless network feature is positioning enhancements. These positioning enhancements, which can be based on millimeter wave-based position sensing, aim to improve the accuracy of mobile device (user equipment or UE) location from what is now on the order of 50 meters to on the order of 1.0 meter for commercial UE devices and less than 0.2 meters for industrial internet of things (IIoT) devices. As a result, services for various scenarios have been and can be developed based on such relatively highly accurate mobile device location sensing.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 7 illustrates example operations related to detecting a potential road-related incident and sending a report including accurate location data regarding the potential road-related incident, in accordance with various aspects and embodiments of the subject disclosure.

FIG. 10 illustrates an example block diagram of an example mobile handset operable to engage in a system architecture that facilitates wireless communications according to one or more embodiments described herein.

DETAILED DESCRIPTION

Figure 1:
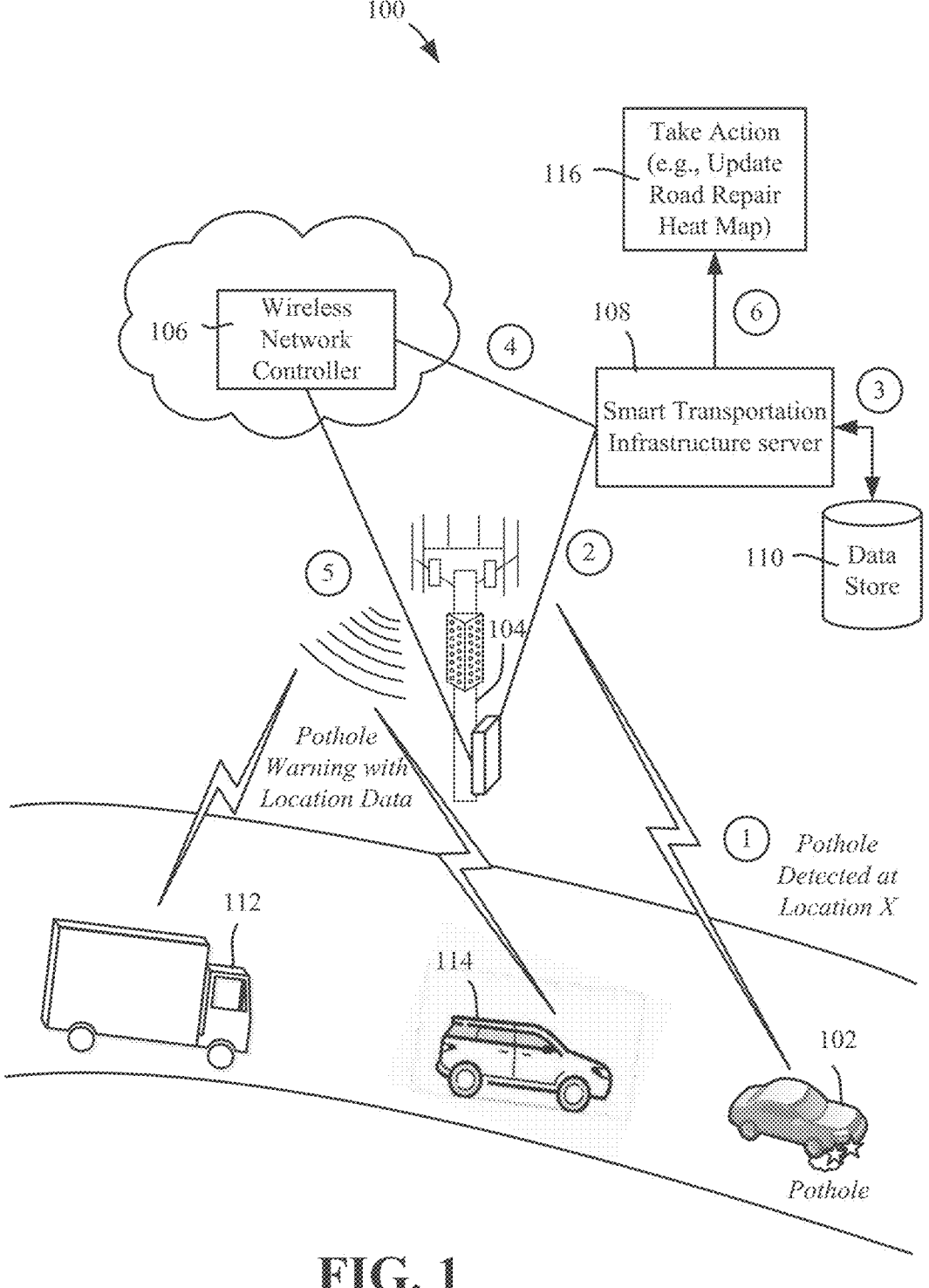
FIG. 1 is a block diagram illustrating an example network communication system in which accurate mobile device location sensing can be used to report a precise location of road damage, in accordance with various aspects and embodiments of the subject disclosure.

The technology described herein is generally directed towards using accurate wireless network location sensing, e.g., the positioning enhancements specified in the 3gpp release 17, to modernize the smart transportation infrastructure. When a vehicle reports a road/traffic related incident, the smart transportation infrastructure can dynamically update the traffic and road conditions with very precise location information, without relying on GPS and/or without any additional designated resources. Based on such a report, the smart transportation infrastructure can analyze (e.g., via artificial intelligence) the incident, and take appropriate action(s), including to predict resulting traffic conditions.

The smart transportation infrastructure can coordinate with other parties, e.g. a road maintenance department in the event of road damage, emergency response services in the event of an accident. For predicted (or actual) heavy traffic caused by a traffic incident, the smart transportation infrastructure can coordinate with a wireless network controller to proactively adjust the allocation of wireless resources and/or balance the wireless data communications load. Automatically-created dynamic road condition information can also be made available to the connected cars/mobile devices in the area, such as for intelligent navigation.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNodeB (gNB)," "evolved Node B (eNodeB)," "home NodeB (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in the example system 100 of FIG. 1, a connected car 102 (or car with a suitable mobile device therein) has encountered road damage, which in this example is a pothole, and reports on the incident. A pothole can be detected via various motion related sensors, including built into the car, or via a program running on a mobile device. Such sensors (e.g., including an accelerometer) can sense motion/movement/vibration of the vehicle, and data analysis can determine that the encounter was road damage, and not, for example, a speed bump. Other road damage such as significant cracks that can be detected can be similarly reported.

As represented in FIG. 1 via circled numerals one (1) and two (2), when detected, the connected car 102 reports the incident via a wireless network communications system (cell site/antennas 104, possibly directly or via a wireless network controller 106) to a smart transportation infrastructure server (STIS) 108. The report includes precise location data of where the pothole was encountered, and can include a description of the issue (e.g., "pothole") along with any other information such as severity level of the pothole, if detectable. A timestamp can also be reported, such as if there is a delay in transmitting the report, although the server can insert its own timestamp when the report is received. The smart transportation infrastructure server 108 records the incident in a data store 110 (circled numeral three (3)), and can take further action based on the incident report.

As is understood, GPS can be used as well, however the location information that is sent can be highly accurate if there is no GPS device available, if GPS is not functioning, and so forth. In such situations, the vehicle 102 and wireless network with the positioning enhancements capability can figure out very accurate location information and pass the location precision information along with the notification message to the smart transportation infrastructure server 108. Note that the wireless network can also provide such a notification on behalf of the vehicle 102.

In the example of FIG. 1, a further action that can be taken is to notify other vehicles 112 and 114 in the area, as represented in FIG. 1 via circled numerals four (4) and five (5). This can include the precise location of the incident.

Another action (block 116) represented by circled numeral six, is to update a road repair map.

In one implementation, aggregated dynamic road condition real-time notifications and dynamic road conditions with the accurate location information and timestamps that are received by the smart transportation infrastructure server 108 are used to automatically create and update a dynamic road condition heat map, e.g., with colors and categories of the road conditions. The heat map can be used by the smart city infrastructure, department of transportation, road maintenance, and any relevant parties to warn to the other vehicles in the area, to send someone to put up a visible warning (e.g., a traffic cone) until a notified crew can fix the road, and so forth. As set forth herein, the dynamic road condition information can also be made available to the connected cars in the area for the intelligent navigation and the like.

For example, an artificial intelligence system in the smart transportation infrastructure server 108 can predict when the road heat map will cross a threshold (a given area in the map turns to red). When this occurs, the smart transportation infrastructure server 108 can take actions (e.g., generate APIs to the collaborating parties) including the wireless network controller 106.

Figure 2:
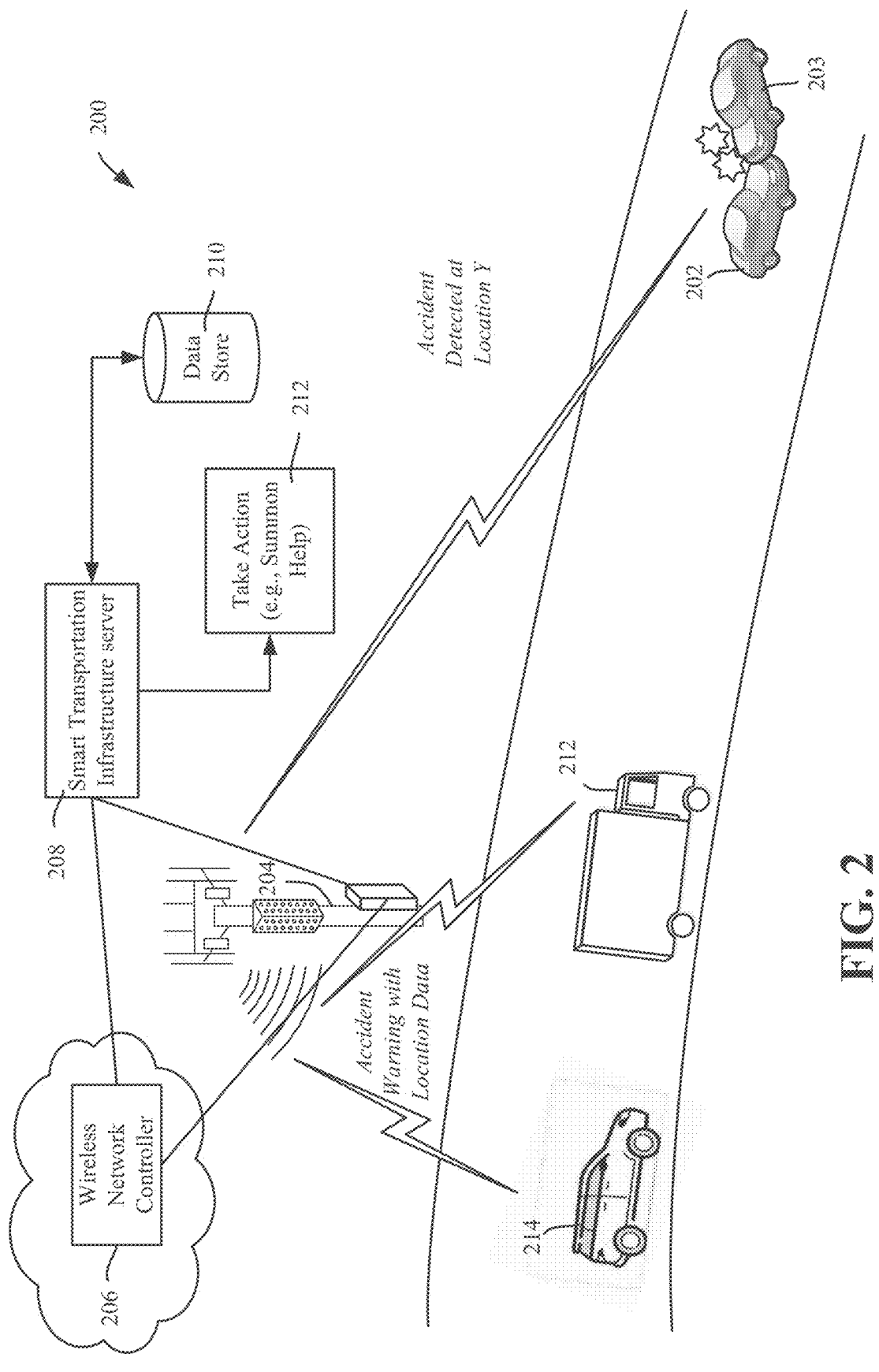
FIG. 2 is a block diagram illustrating an example network communication system in which accurate mobile device location sensing can be used to report a precise location of a vehicle accident, in accordance with various aspects and embodiments of the subject disclosure.

FIG. 2 shows another use case for the technology described herein, namely a vehicle accident involving cars 202 and 203 in this example. Note that many of the components of the system 200 of FIG. 2 are similar to those of FIG. 1 (e.g., labeled 2xx instead of 1xx) and are not described again for purposes of brevity.

If at least one of the cars 202 or 203 is a connected car involved in a car accident, the connected car(s) automatically sends a "911" notification, including the exact location information if available. If no GPS, or GPS is not functioning because of a severe traffic crash, a notification without the location information can be sent by the connected car, and the wireless network (with Positioning Enhancements capability) can determine the (very nearly) exact location information, and pass the location precision information along with the notification message to the smart transportation infrastructure server 208. Note that while the example of FIG. 2 shows two vehicles 202 and 203 as being involved in the accident, it is understood that the technology described herein works with a single car accident in which only one vehicle is involved, e.g., has struck a tree or lamppost, has run off the road and/or rolled over, or the like.

Thus, the wireless network with positioning enhancements capability can determine the exact location information and pass the Location Precision information, along with the notification message, to the 911 operator, which will trigger necessary operations, e.g., send an ambulance, police and the like. This action (e.g., block 212, summon help) can also be done by the smart transportation infrastructure server 208, which has the location information along with identity information of the vehicle(s) involved.

Further, based on the real-time notification(s) with the accurate location information and timestamp, the smart transportation infrastructure server 208 can, via the wireless network components (e.g., 204 and 206) can notify other vehicles 212 and 214 in the area for intelligent navigation, as well as notify more distant vehicles that may be approaching the area to avoid the location/road in that area if possible. Further, the smart transportation infrastructure server 208 can predict that heavy traffic will likely result, and notify other parties, including the wireless network controller 206. The wireless network controller 206 can, based on the likely heavy traffic, allocate additional wireless resources and/or balance the data communications load to proactively respond to the overloaded traffic situation that will likely result from this incident. The auto-created dynamic road condition information can also be made available to all the connected cars in the area for the intelligent navigation, etc.?

Figure 3:
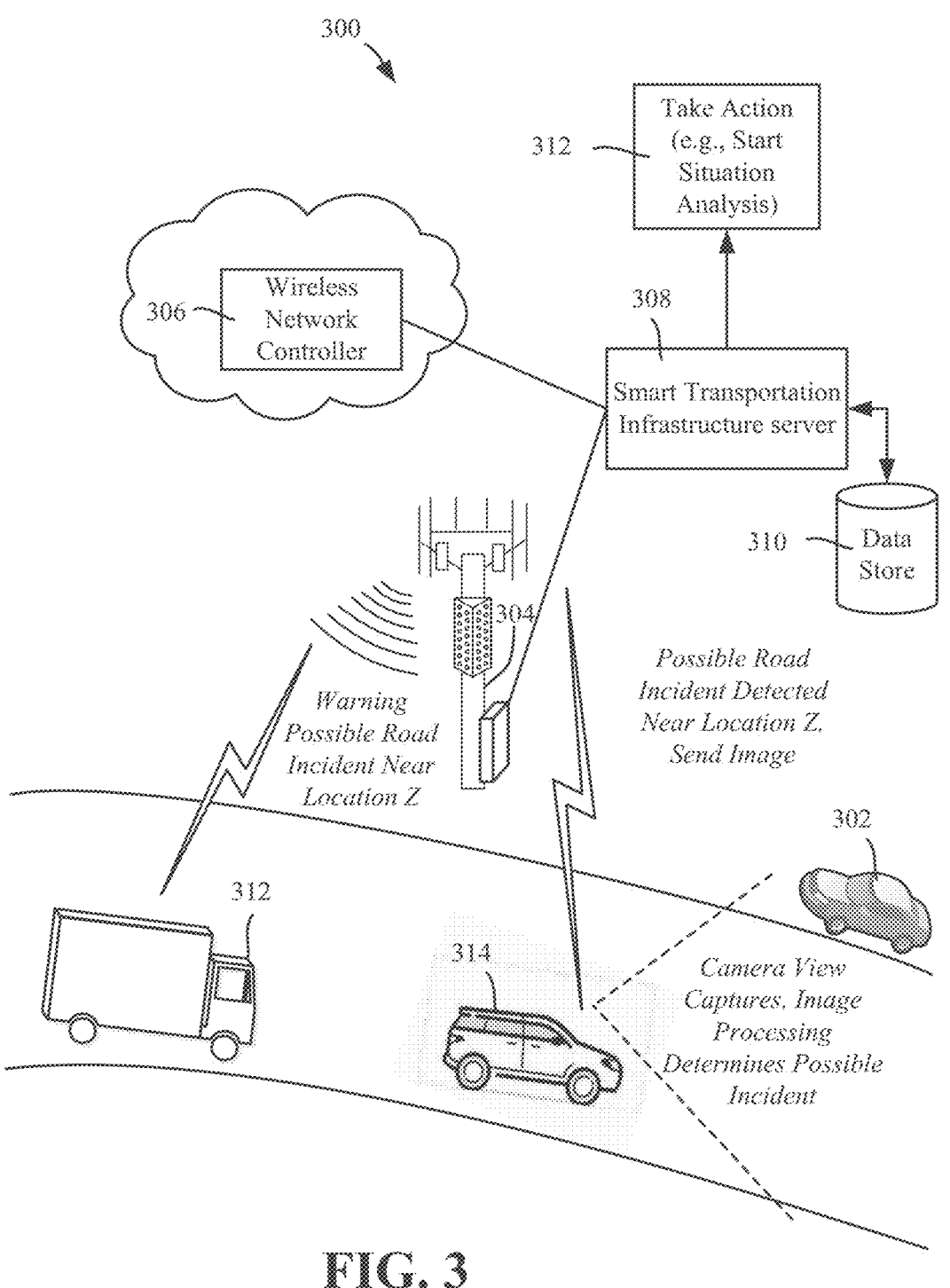
FIG. 3 is a block diagram illustrating an example network communication system in which accurate mobile device location sensing can be used to report a precise location of a vehicle that is possibly in distress, in accordance with various aspects and embodiments of the subject disclosure.

FIG. 3 shows another example scenario, in which one vehicle 314 senses that another vehicle 302 may be in distress. Note that many of the components of the system 300 of FIG. 3 are similar to those of FIG. 1 (e.g., labeled 3xx instead of 1xx) and are not described again for purposes of brevity.

In the example of FIG. 3, consider that the vehicle 314 has a camera, and regularly goes past the location in which the vehicle 302 is currently pulled over and viewed by the camera. Normally there is no vehicle at that location, and thus technology in the vehicle 314 via simple image comparison with past, stored samples of location-based image data determines an anomaly.

When an anomaly is detected, a report of the possible road incident, which includes the accurate location of the vehicle 314 and at least one captured image can be sent to the smart transportation infrastructure server 308 for further analysis (e.g., block 312). As one example, artificial intelligence and/or more powerful image processing can be used by the smart transportation infrastructure server 308 to more thoroughly assess the situation, and possibly escalate the incident to a human reviewer of the image, summon police and so forth. Timing may be a factor, such as to request that other vehicles capture and upload images at that location and take no further action unless the vehicle remains pulled over for more than J (e.g., five) minutes or no further images are received within K (e.g., ten) minutes.

Figure 4:
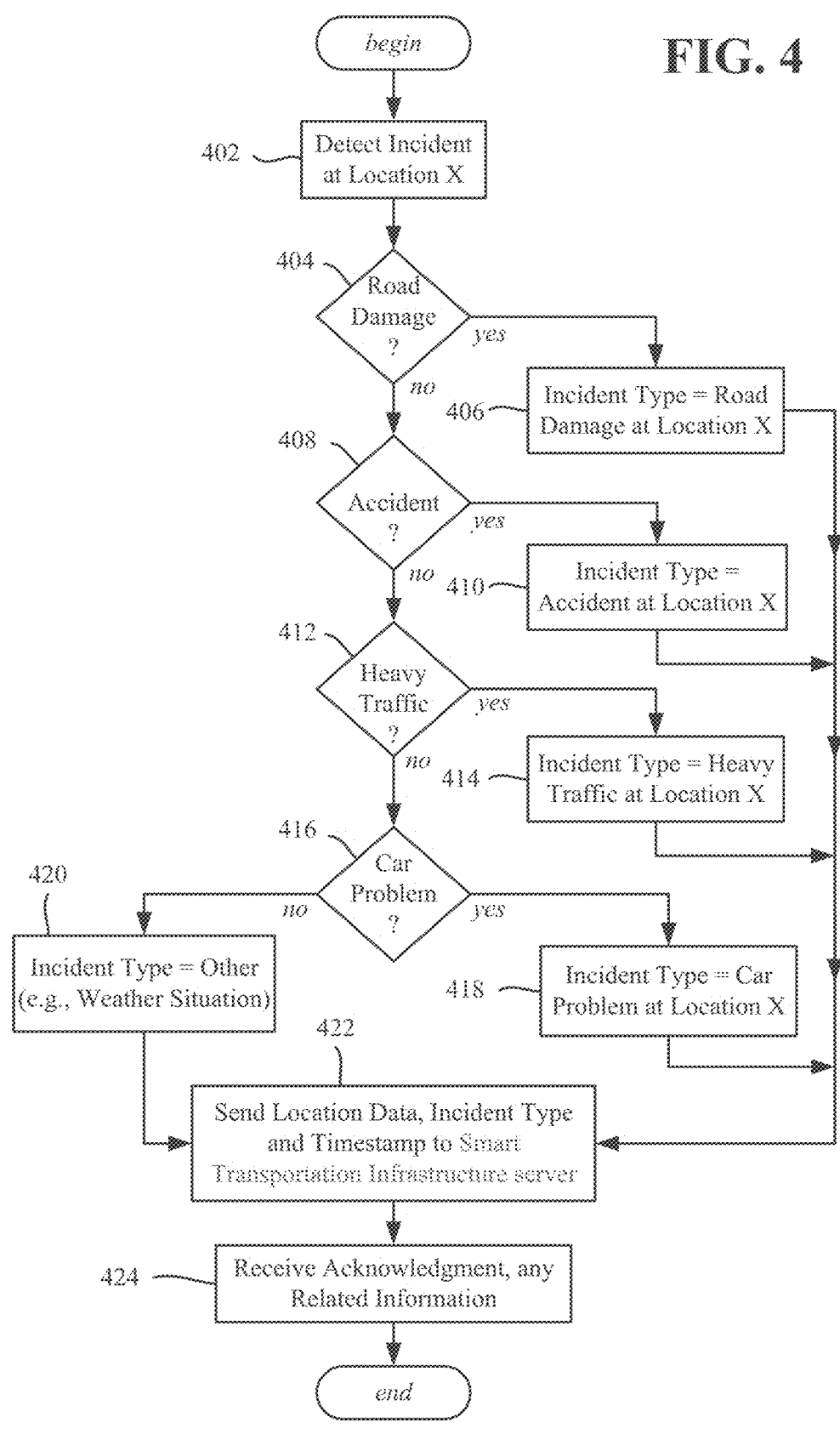
FIG. 4 is a flow diagram illustrating example operations that can be performed in response to detecting a traffic-related incident, in accordance with various aspects and embodiments of the subject disclosure.

FIG. 4 shows some example operations that can be taken when an incident (e.g., road damage, accident, vehicle potentially in distress as well as others) is detected at some location X, as represented by operation 402. If at operation 404 road damage is detected, operation 406 sends the appropriate report. If at operation 408 an accident is detected, operation 410 sends the appropriate report.

Another report can be sent via operations 412 and 414 in the event that heavy traffic is encountered for whatever reason. This reporting can be throttled by the smart transportation infrastructure server to avoid many vehicles sending the same report, or when heavy traffic is typical (e.g., rush hour in a crowded urban area). However, sometimes heavy traffic occurs unexpectedly, and thus a notification to the smart transportation infrastructure server may be used for some beneficial purpose, such as to further investigate the cause (e.g., cargo spilled on the road) and take action. Action can include warning other vehicles of the traffic, notifying the wireless network to reallocate and/or load balance resources, and so forth.

Another report can be sent regarding a car problem, such as mechanical trouble, running out of gas, and so forth. Operations 416 and 418 can be used to generate such a report. Still another report can be generated and sent for another reason, such an incident involving weather (e.g., fog, black ice, heavy winds and the like) that can be sensed. A large object on the road (e.g., boulder or fallen tree) can be sensed by a vehicle swerving to avoid it, as well as via camera reporting of an anomaly as described herein.

Operation 422 sends the report including location data (which can be added by the network or returned by the wireless network to the vehicle to include in its report) and incident type, and timestamp if needed to the smart transportation infrastructure server. Any other information such as image data, identity of the sender and so forth can be sent with the report. Operation 424 represents receiving an acknowledgement from the smart transportation infrastructure server, along with possibly instructions "situation is known and being acted upon, please do not report this same issue again" or the like.

Figure 5:
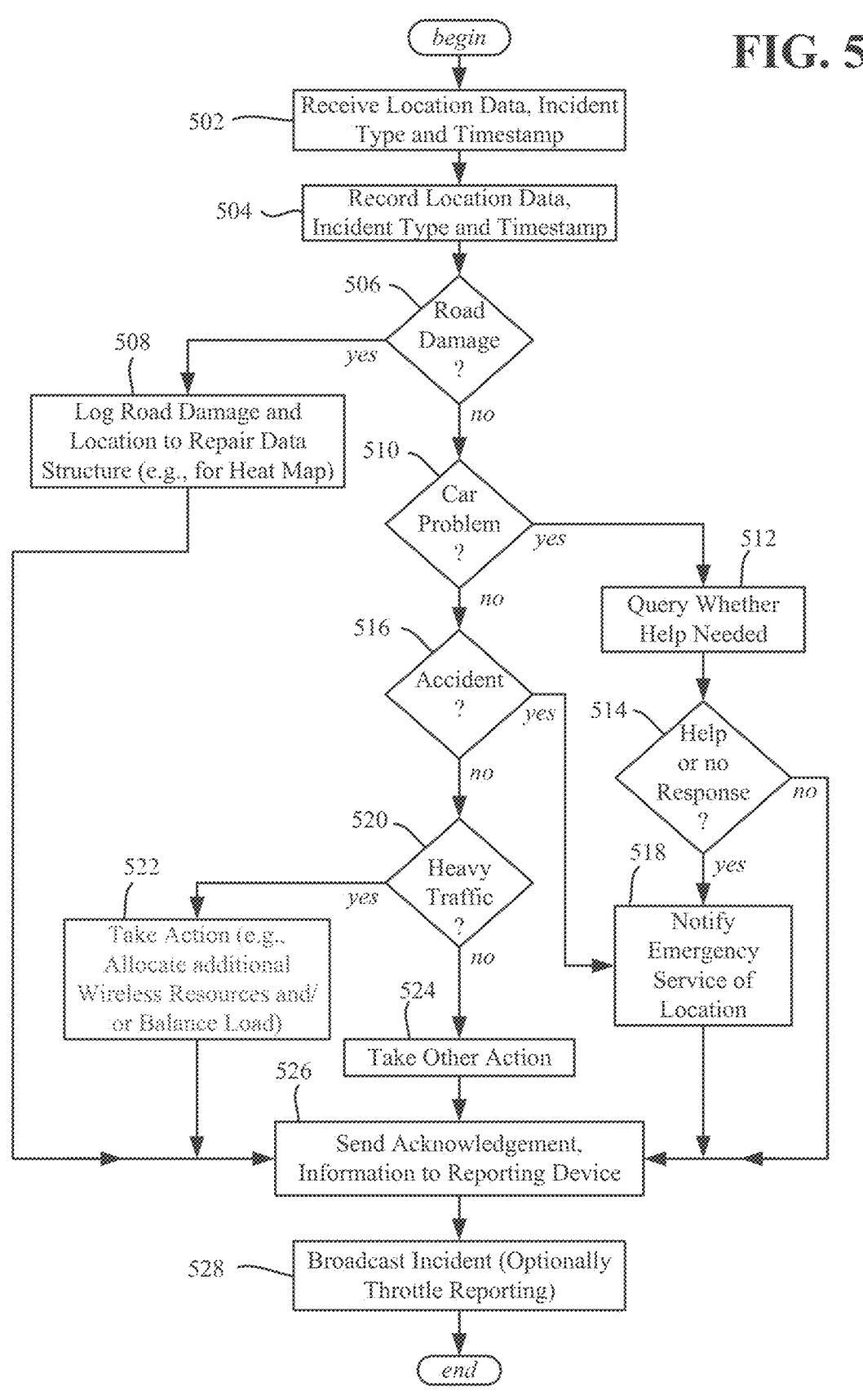
FIG. 5 is a flow diagram illustrating example operations that can be performed in response to receiving accurate location data related to a traffic-related incident, in accordance with various aspects and embodiments of the subject disclosure.

FIG. 5 shows some example operations that can be taken by the smart transportation infrastructure server when an incident report is received (operation 502). Operation 504 records the report data.

Operation 506 evaluates the report to determine whether it is related to road damage. If so, operation 508 logs the location and type information (e.g., pothole) to a repair-related data structure, e.g., updates a heat map as described herein. The example operations continue at operation 526, described below.

Operation 510 evaluates whether the report is related to a car problem. If so, operation 512 queries whether help is needed, e.g., sends a message, makes an automated call, communicates with the car to get sensor(s) data, and so forth. If help is needed or no timely response to the query is received at operation 514, operation 518 notifies the appropriate emergency service, e.g., a towing service. If an accident is determined via operation 516, operation 518 (directly, without a query) notifies the authorities (police/sheriff) and possibly an ambulance service if appearing to be severe. Note that some jurisdictions require that motorists do not summon police in the event of a minor accident where there is no injury and both vehicles are drivable, however the authorities can be notified in any event, and choose to look into the matter as deemed appropriate.

Operation 520 evaluates whether the report is related to heavy traffic. If so, operation 522 takes some action, e.g., notifies the wireless network to reconfigure/reallocate resources, if unexpected sends a report to authorities to investigate (e.g., via traffic cameras, by sending an authorized vehicle to determine what is causing the traffic), and so forth.

If not heavy traffic, then the cause is something else, e.g., weather. A suitable action can be taken at operation 524, e.g., send a snow plough to move accumulated snow, send a salt truck to melt black ice, and so forth.

For any report, in this example operation 526 sends an acknowledgement to the reporting device, which may include any further information ("help is on the way, move to a safe place"). The device and the vehicle driver/occupants thus knows that the system is aware need not resend the report, and what to expect.

Operation 528 represents broadcasting any information, if relevant, to other vehicles in the area. This can be used to assist in navigation around the incident. As set forth above, this can be used to throttle further reporting of the same incident, e.g., unexpected heavy traffic in the same general location need not be reported over and over and potentially swamp the wireless service and server's resources for something already know about. Something like road damage may be reported many times by different vehicles, however, as an indication that the damage cannot be avoided and that the situation should be fixed as soon as possible.

Figures 6A, 6B:
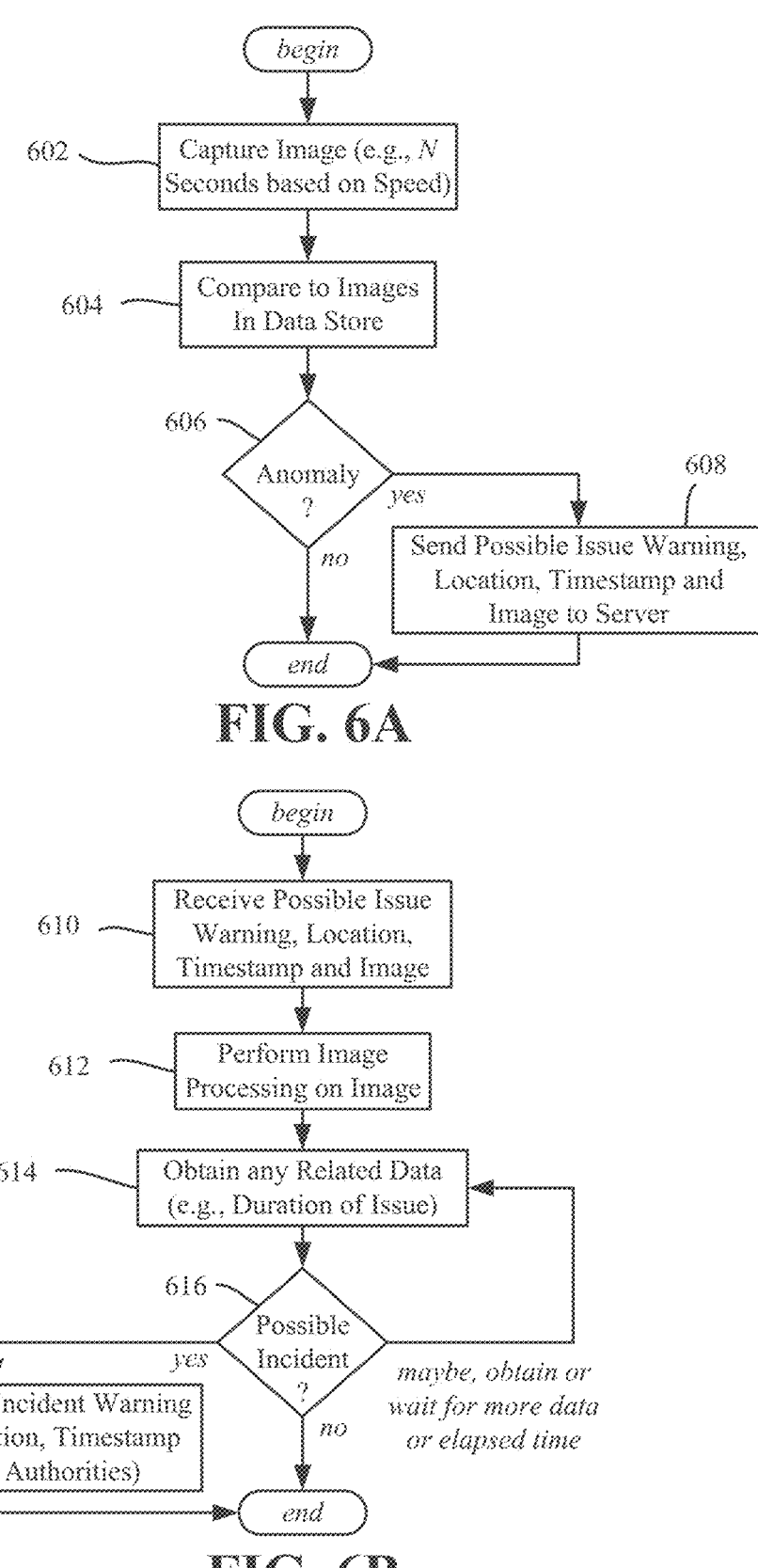
FIG. 6A is a flow diagram illustrating example operations that can be performed in response to capturing an image of a traffic-related incident, in accordance with various aspects and embodiments of the subject disclosure.
FIG. 6B is a flow diagram illustrating example operations that can be performed in response to receiving a report and an image of a traffic-related incident, in accordance with various aspects and embodiments of the subject disclosure.

FIG. 6A shows example operations directed to reporting an anomaly, as described with reference to FIG. 3. Operation 602 represents the capturing of an image, which can be a sample with a sampling rate depending on the speed of the vehicle). Note that video can be recorded for other purposes, but it may be impractical or impossible for a less powerful device to analyze each frame and thus sample image can be evaluated for anomalies.

Operation 604 analyzes the image, e.g., compares the image with previously recorded frames captured at the same location, and/or with an image dataset of typical vehicle-in-distress images. If there is an anomaly as detected via operation 606, operation 608 sends a report of the possible issue to the server, e.g., including the captured image(s) or a description thereof (e.g., car unusually pulled over at location Z, car appears to have struck a lamppost at location Z, and so on depending on how much the image analysis is able to determine).

FIG. 6B shows example operations that can be taken upon receiving an issue report, as represented by operation 610. In this example the report include at least one image, and operation 612 performs image processing, e.g., more sophisticated analysis using artificial intelligence or the like. Operation 614 represents obtaining any related data, e.g., several such reports have come in at the same location over the last five minutes.

Operation 616 represents making a determination as to whether this is a possible incident worth acting upon. No action may be taken; for example, the image may be of a safely pulled over vehicle that the police have already investigated and have marked for future towing if not moved in the next few hours. If so, operation 618 is performed to escalate the incident. This can be to notify authorities, or have the image reviewed by a human to make a decision as to the next action. Another option is to wait a little while for more data, which can be from other sources (other vehicle reports, or a traffic camera in the area). This can avoid a situation in which the police are summoned too frequently for very minor situations, such as someone briefly pulling over to make or answer a phone call or enter an address into a map application program to get directions.

One or more example aspects are represented in FIG. 7, and can correspond to a mobile device and/or system, comprising a processor, and a memory that stores executable instructions that, when executed by the processor of the system, facilitate performance of operations. Example operation 702 represents detecting, by the mobile device, in a vehicle containing the mobile device, a potential road-related incident. Example operation 704 represents, in response to the detecting, obtaining, via mobile device millimeter wave-based position sensing, location data of the mobile device with respect to the potential road-related incident (operation 706), and transmitting potential road-related incident report information related to the potential road-related incident and the location data of the mobile device, to a transportation-related entity for analysis of the potential road-related incident (operation 708).

Further operations can include transmitting timestamp data representing a time associated with the detecting.

The transportation-related entity can include a smart transportation infrastructure server.

Detecting the potential road-related incident can include determining that the vehicle has encountered road damage. Transmitting the location data of the mobile device can include transmitting the location data for inclusion in a heat map representing road damage summary data.

Detecting the potential road-related incident can include determining that the vehicle has been involved in an accident.

Detecting the potential road-related incident can include determining that another vehicle, other than the vehicle, is potentially in distress.

Further operations can include transmitting image data in association with transmitting the location data and current timestamp data.

Detecting the potential road-related incident can include determining that the vehicle is encountering traffic that exceeds traffic volume threshold data.

Further operations further can include receiving, from the transportation-related entity, information indicating that the transportation-related entity is aware of the incident to avoid repeated retransmission of the potential road-related incident report information.

Figure 8:
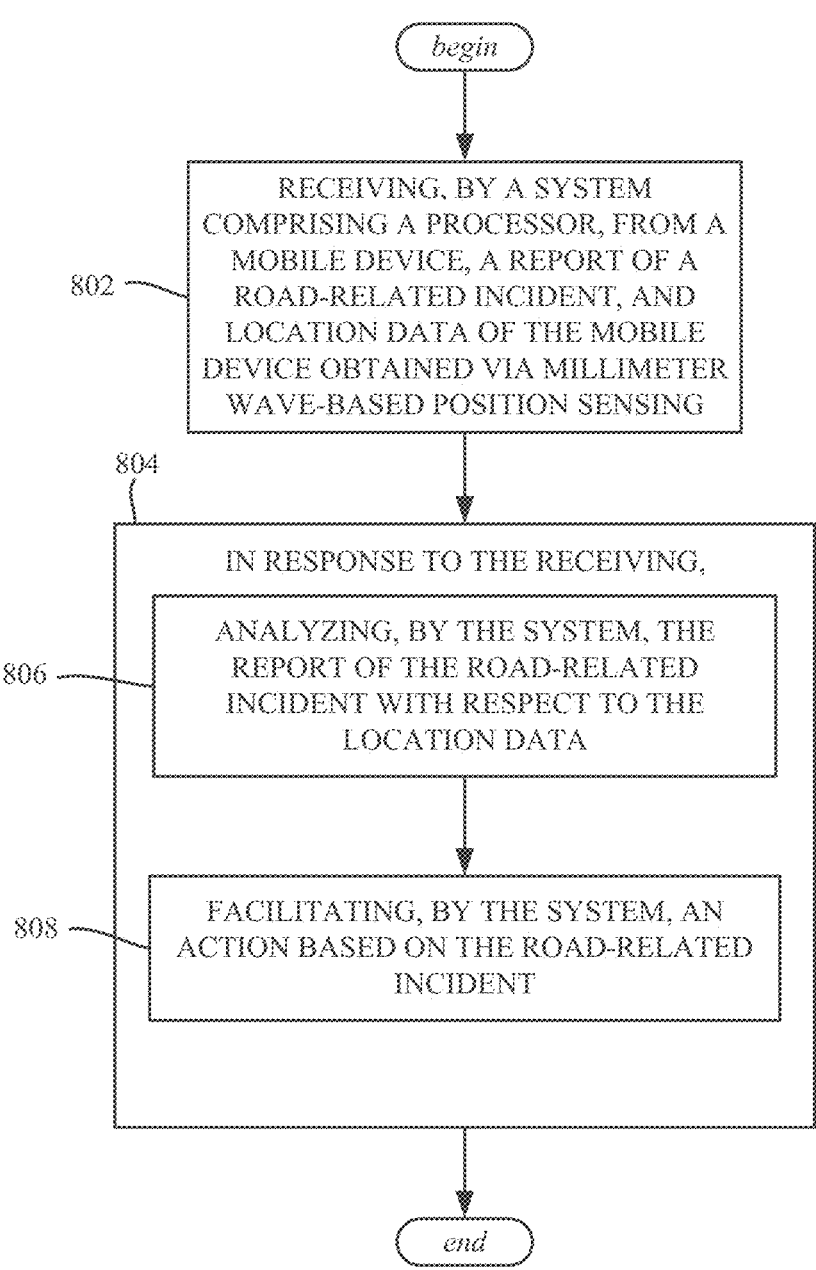
FIG. 8 illustrates example operations related to receiving a report of a road-related incident and taking an action based thereon, in accordance with various aspects and embodiments of the subject disclosure.

One or more example aspects are represented in FIG. 8, and can correspond to example operations, e.g., of a method. Operation 802 represents receiving, by a system comprising a processor, from a mobile device, a report of a road-related incident, and location data of the mobile device obtained via millimeter wave-based position sensing. Operation 804 represents, in response to the receiving, analyzing, by the system, the report of the road-related incident with respect to the location data (operation 806), and facilitating, by the system, an action based on the road-related incident (operation 808).

The report can indicate road damage, and facilitating the action based on the road-related incident can include entering the location data into a road damage data structure, and determining priority data from the road damage data structure with respect to scheduling repair of the road damage.

The report can indicate that a vehicle that is potentially in distress, and facilitating the action based on the road-related incident can include reviewing image data associated with the potential accident to determine whether to notify an emergency response entity.

The report can indicate an accident to a defined level of certainty, and facilitating the action based on the road-related incident can include notifying an emergency response entity.

The report can indicate traffic that exceeds a threshold traffic level, and facilitating the action based on the road-related incident can include allocating additional wireless communication resources in an area corresponding to the location data.

The report can indicate traffic that exceeds a threshold traffic level, and facilitating the action based on the road-related incident can include load balancing wireless communications across access points in an area corresponding to the location data.

Figure 9:
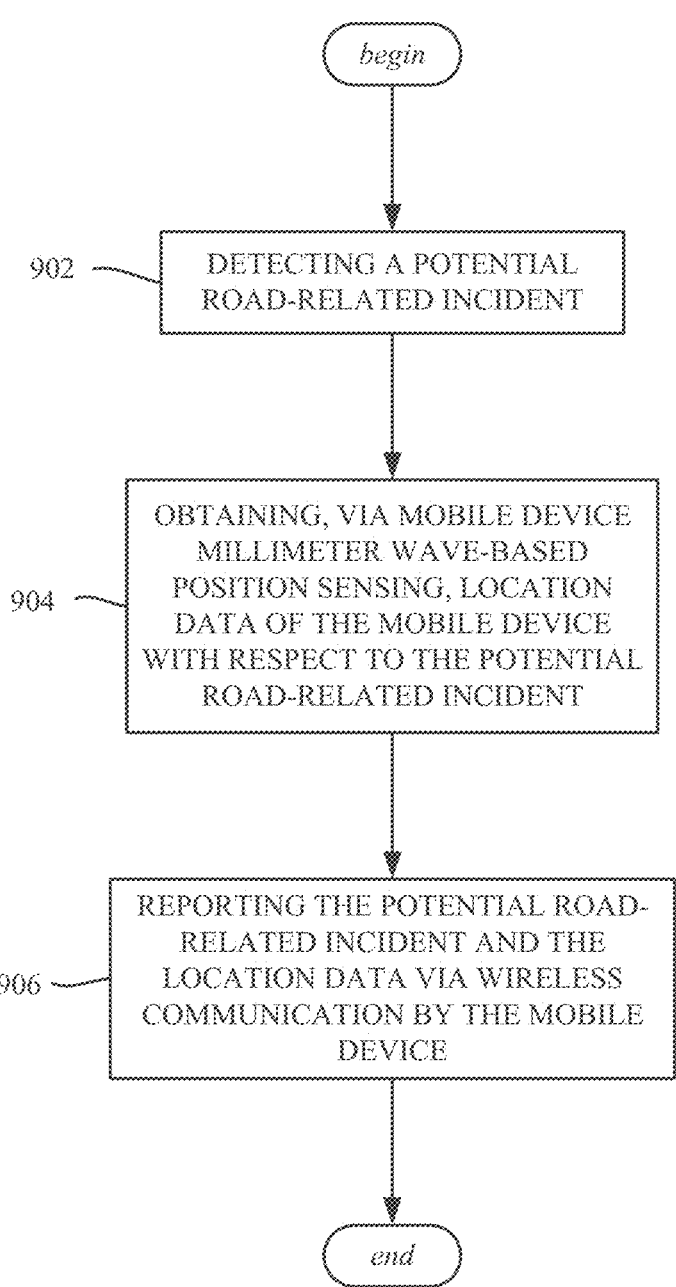
FIG. 9 illustrates example operations related to detecting a potential road-related incident and reporting the potential incident along with accurate location data, in accordance with various aspects and embodiments of the subject disclosure.

One or more aspects are represented in FIG. 9, such as implemented in a machine-readable medium, including executable instructions that, when executed by a processor of a mobile device, facilitate performance of operations. Operation 902 represents detecting a potential road-related incident. Operation 904 represents obtaining, via mobile device millimeter wave-based position sensing, location data of the mobile device with respect to the potential road-related incident. Operation 906 represents reporting the potential road-related incident and the location data via wireless communication by the mobile device.

Further operations can include sending image data in association with reporting the potential road-related incident and the location data.

Further operations can include receiving information indicating that an entity is aware of the potential road-related incident, and, in response to receiving the information, halting a re-reporting of the potential road-related incident.

Detecting the potential road-related incident can include detecting at least one of: potential road damage, a potential accident of a first entity associated with the mobile device, or a potential accident of a second entity that is not associated with the mobile device.

As can be seen, the technology described herein enhances the smart transportation infrastructure by leveraging new wireless network features including positioning enhancements capability. Based on the accurate location, the smart transportation infrastructure can dynamically update the traffic and road conditions, and take action, without relying on GPS and/or any additional designated resources. For example, the smart transportation infrastructure (server) can use artificial intelligence to predict traffic jams, summon help to a given location, request road repairs at a given location, and the like. The dynamic road condition information can also be broadcast to other vehicles in the area of the location.

Turning to aspects in general, a wireless communication system can employ various cellular systems, technologies, and modulation schemes to facilitate wireless radio communications between devices (e.g., a user equipment/UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier 1-DMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Referring now to FIG. 10, illustrated is a schematic block diagram of an example end-user device (such as a user equipment) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1094) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 810, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
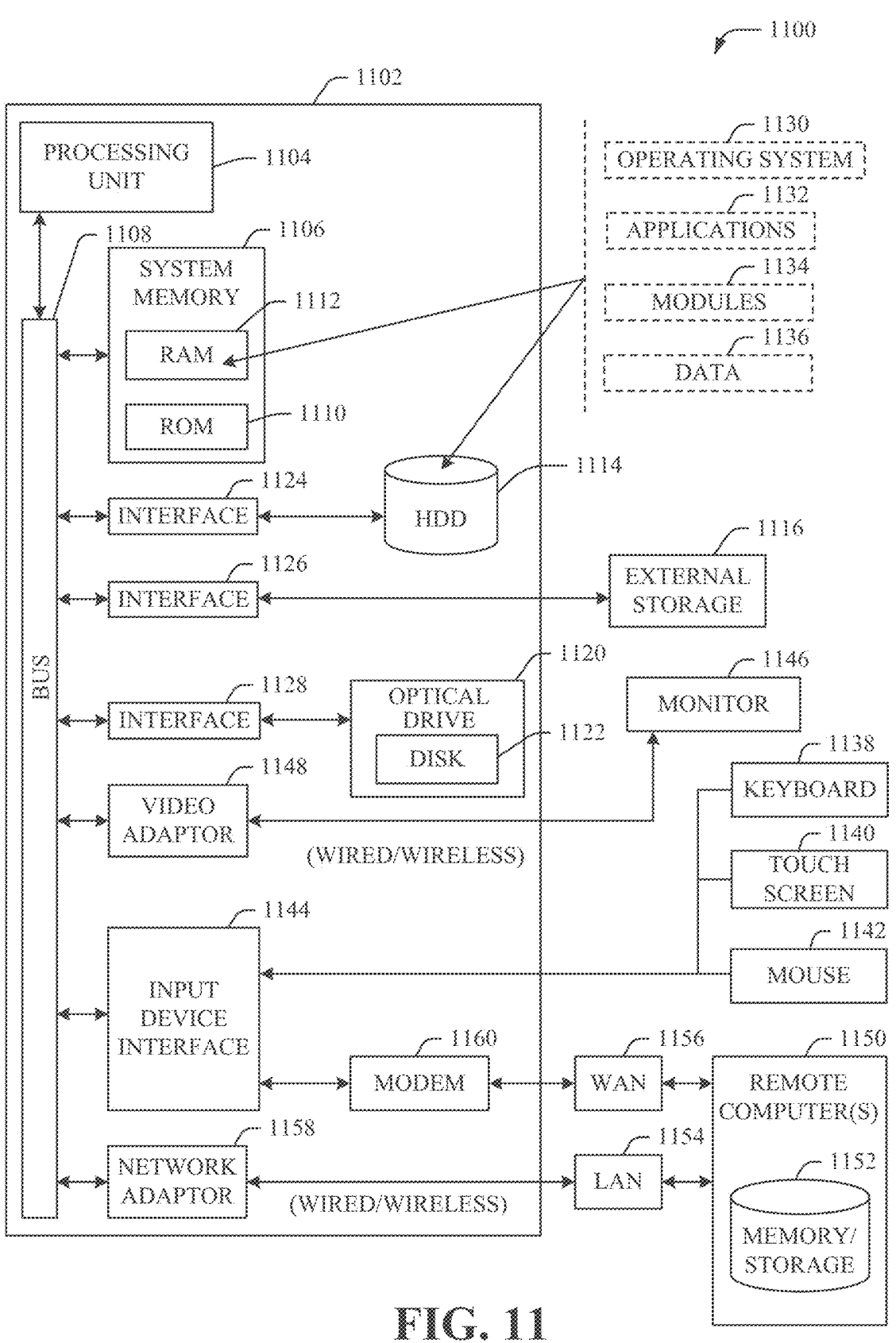
FIG. 11 illustrates an example block diagram of an example computer/machine system operable to engage in a system architecture that facilitates wireless communications according to one or more embodiments described herein.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD), non-volatile memory and other storage technology could be used in addition to, or in place of, an HDD 1114, and can be internal or external. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally include emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can include one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1094 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 11 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A mobile device, comprising:

a processor; and a memory that stores executable instructions that, when executed by the processor of the mobile device, facilitate performance of operations, the operations comprising:

detecting, by the mobile device, in a vehicle containing the mobile device, a road-related incident, wherein the detecting the road-related incident comprises determining that another vehicle, other than the vehicle, is potentially in distress, based on captured image data of the another vehicle, wherein the detecting the road-related incident further comprises determining that the another vehicle is on a side of a road; and in response to the detecting, obtaining location data of the mobile device with respect to the road-related incident; and transmitting first road-related incident report information related to the road-related incident comprising the captured image data of the another vehicle, first timestamp data representing a time associated with the detecting, and the location data of the mobile device, to a transportation-related entity for analysis of the road-related incident, wherein the first road-related incident report information is utilized as a basis for the transportation-related entity to instruct a second vehicle to capture second image data and to transmit the second image data as second road-related incident report information of the road-related incident with second timestamp data, and wherein the second timestamp data comprises a later timestamp relative to the first timestamp data to allow the transportation-related entity to determine an elapsed time between first timestamp data and the second timestamp data for use in determining that the another vehicle is in distress, wherein the elapsed time is greater than five minutes.

2. The mobile device of claim 1, wherein the transportation-related entity comprises a smart transportation infrastructure server.

3. The mobile device of claim 1, wherein the detecting the road-related incident comprises determining that the another vehicle, other than the vehicle, is potentially in distress by comparing the captured image data against stored location based data.

4. The mobile device of claim 1, wherein the detecting the road-related incident further comprises determining that the vehicle is encountering traffic that exceeds traffic volume threshold data.

5. The mobile device of claim 1, wherein the operations further comprise receiving, from the transportation-related entity, information indicating that the transportation-related entity is aware of the road-related incident to avoid repeated retransmission of the first road-related incident report information.

6. A method, comprising:

receiving, by a system comprising a processor, from a mobile device, a first report of a road-related incident comprising that another vehicle is potentially in distress, wherein the first report comprises captured image data of the another vehicle, first timestamp data representing a time associated with a detecting of the road-related incident by the mobile device, and location data of the mobile device, wherein the first report of the road-related incident further indicates that the another vehicle is on a side of a road; and in response to the receiving, analyzing, by the system, the first report of the road-related incident with respect to the location data, the first timestamp data, and the captured image data of the another vehicle;

responsive to the first report, instructing, by the system, a second vehicle to capture second image data and to transmit the second image data in a second report of the road-related incident with second timestamp data, wherein the second timestamp data comprises a later timestamp relative to the first timestamp data;

analyzing, by the system, the second report comprising the second timestamp data with respect to the first report comprising the first timestamp data to allow the system to determine an elapsed time between first timestamp data and the second timestamp data, and to determine that the another vehicle is in distress, wherein the elapsed time is greater than five minutes; and facilitating, by the system, an action based on the analyzing indicating that the another vehicle is in distress.

7. The method of claim 6, wherein the facilitating the action based on the first report and the second report of the road-related incident comprises reviewing the captured image data of the another vehicle to determine whether to notify an emergency response entity.

8. The method of claim 6, wherein the first report further indicates an accident to a defined level of certainty, and wherein the facilitating comprises notifying an emergency response entity.

9. The method of claim 6, wherein the first report further indicates traffic that exceeds a threshold traffic level, and wherein the facilitating comprises allocating additional wireless communication resources in an area corresponding to the location data.

10. The method of claim 6, wherein the first report further indicates traffic that exceeds a threshold traffic level, and wherein the facilitating comprises load balancing wireless communications across access points in an area corresponding to the location data.

11. A non-transitory machine-readable medium, comprising executable instructions that, when executed by a processor of a mobile device, facilitate performance of operations, the operations comprising:

capturing one or more images of another vehicle to generate captured image data of the another vehicle;

detecting a road-related incident comprising that the another vehicle is potentially in distress based on the captured image data of the another vehicle, wherein the detecting the road-related incident further comprises determining that the another vehicle is on a side of a road;

obtaining, via the mobile device, location data of the mobile device with respect to the road-related incident; and reporting the road-related incident via a first report to a transportation-related entity for analysis, the first report comprising the captured image data of the another vehicle, first timestamp data representing a time associated with the detecting, and the location data via wireless communication by the mobile device, wherein the first report is utilized as a basis by the transportation-related entity to instruct a second vehicle to capture second image data and to transmit the second image data in a second report of the road-related incident with second timestamp data, and wherein the second timestamp data comprises a later timestamp relative to the first timestamp data to allow the transportation-related entity to determine an elapsed time between first timestamp data and the second timestamp data for use in determining that the another vehicle is in distress, wherein the elapsed time is greater than five minutes.

12. The non-transitory machine-readable medium of claim 11, wherein the operations further comprise:

requesting other vehicles to send additional image data in association with the reporting the road-related incident and the location data, wherein the other vehicles comprise the second vehicle.

13. The non-transitory machine-readable medium of claim 11, wherein the operations further comprise:

receiving information indicating that an entity is aware of the road-related incident, and, in response to the receiving the information, halting a re-reporting of the road-related incident.

14. The non-transitory machine-readable medium of claim 11, wherein the transportation-related entity comprises a smart transportation infrastructure server.

15. The non-transitory machine-readable medium of claim 11, wherein the detecting the road-related incident further comprises determining that the another vehicle has encountered road damage.

16. The non-transitory machine-readable medium of claim 11, wherein the detecting the road-related incident comprises determining that the another vehicle is potentially in distress by comparing the captured image data against stored location based data.

17. The non-transitory machine-readable medium of claim 11, wherein the detecting the road-related incident further comprises determining that a vehicle containing the mobile device is encountering traffic that exceeds a threshold traffic level.

18. The non-transitory machine-readable medium of claim 17, wherein the first report further indicates the traffic that exceeds the threshold traffic level.

19. The non-transitory machine-readable medium of claim 11, wherein the first report further indicates an accident to a defined level of certainty.

*    *    *    *    *